J. E. CAMMEYER.
Coolers for Water.
No. 143,058. Patented September 23, 1873.
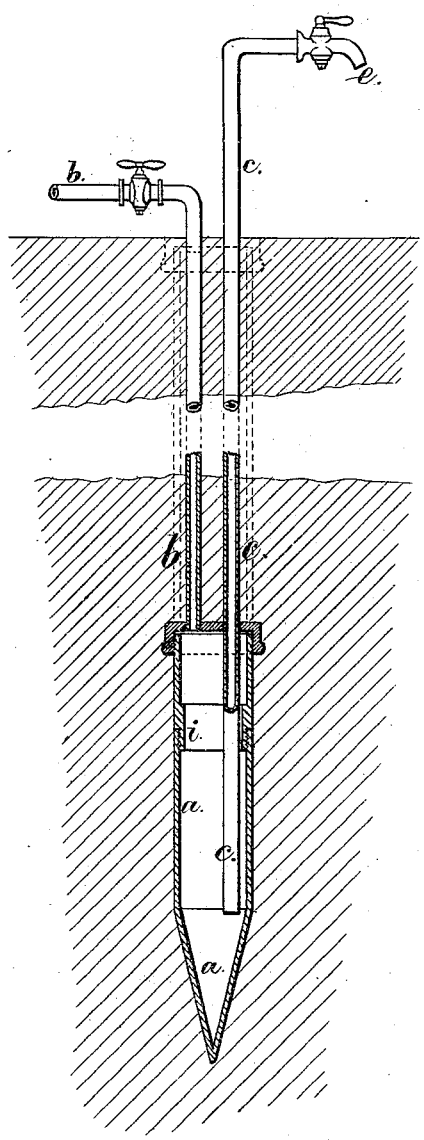
Witnesses,
Chas H Smith
Geo S Pinckney
Inventor
John E. Cammeyer,
per Lemuel W. Serrell
att'y.

UNITED STATES PATENT OFFICE.

JOHN E. CAMMEYER, OF BROOKLYN, NEW YORK.

IMPROVEMENT IN COOLERS FOR WATER.

Specification forming part of Letters Patent No. 143,058, dated September 23, 1873; application filed July 16, 1873.

*To all whom it may concern:*

Be it known that I, JOHN E. CAMMEYER, of Brooklyn, Kings county, New York, have invented an Improvement in Water-Coolers, of which the following is a specification:

In most places, a well that is fifteen to twenty feet deep will contain water that is sufficiently cool for ordinary drinking purposes, even when the weather is very warm, and at greater depths the water will be cooler.

I avail of this well-known fact to construct a water-cooler for reducing the temperature of water under pressure sufficiently for drinking purposes. I make use of a conical-ended tubular vessel driven down into the earth sufficiently deep, and to which two pipes are connected, one from the top and the other passing to the bottom, and through these the water to be cooled passes. The supply and delivery pipes should be small, or of poor conducting material, while the vessel should be of metal. Thereby the surrounding circumstances will conspire to reduce the temperature of water in the vessel to about the same degree as well-water from a corresponding depth. Of course the size of the vessel must be proportioned to the quantity of water drawn from time to time.

In the drawing I have illustrated my improvement by a vertical section.

The metallic vessel $a$, with a conical bottom and of suitable size, is driven down or sunk into the earth a sufficient depth; and $b$ is the supply-pipe leading down from the surface to such vessel $a$, and $c$ is the delivery-pipe. This pipe $c$ should pass down nearly to the bottom, in order to take the coolest water, and if said pipe $c$ is of non-conducting material, or incased in such non-conducting material, the temperature of the water will be but slightly increased as it passes through said pipe to the point of delivery $e$.

The vessel $a$ may be made as a tube that can be elongated by separate sections screwed together, as at $i$, and in many instances it will be the most convenient to employ a tubular vessel, $a$, that is long enough to reach down to the desired distance, so that the water will be cooled, and the coldest water is drawn through the pipe $c$, reaching to near the bottom of the vessel. The dotted lines illustrate the vessel as extending from the surface down to the required depth.

I do not claim a box or vessel sunk in the earth to which water-pipes are connected. This is difficult to employ, because a hole for it has to be dug. My improvement is available in sandy soil, and under other circumstances where the tubular vessel with the conical point can be forced down into the earth without excavating.

I claim as my invention—

A tubular water-cooling vessel provided with a conical point, so as to be forced down into the earth, and to which vessel the pipes $b$ and $c$ are connected, as set forth.

Signed by me this 12th day of July, 1873.

JOHN E. CAMMEYER.

Witnesses:
GEO. T. PINCKNEY,
CHAS. H. SMITH.